United States Patent [19]

Harte

[11] Patent Number: 4,786,896

[45] Date of Patent: Nov. 22, 1988

[54] INPUT MECHANISM FOR WORD PROCESSOR

[76] Inventor: J. Richard Harte, 10 W. Concord, Kansas City, Mo. 64112

[21] Appl. No.: 763,980

[22] Filed: Aug. 9, 1985

[51] Int. Cl.⁴ .............................................. G09G 3/02
[52] U.S. Cl. .................................... 340/712; 340/718; 178/18
[58] Field of Search ............... 340/709, 712, 706, 707, 340/718; 178/18, 19; 434/118

[56] References Cited

U.S. PATENT DOCUMENTS

| | | | |
|---|---|---|---|
| 3,921,165 | 11/1975 | Dym | 178/18 |
| 4,078,257 | 3/1978 | Bagley | 340/712 |
| 4,229,736 | 10/1980 | Rougeot | 340/718 |
| 4,503,286 | 3/1985 | Kubo et al. | 178/18 |
| 4,521,870 | 6/1985 | Babble et al. | 340/712 |
| 4,531,119 | 7/1985 | Nakayama et al. | 340/712 |
| 4,570,149 | 2/1986 | Thornburg et al. | 178/18 |
| 4,571,454 | 2/1986 | Tamain et al. | 178/18 |
| 4,622,013 | 11/1986 | Cercchio | 434/118 |

FOREIGN PATENT DOCUMENTS 55-20536  2/1980  Japan ..................................... 178/18

OTHER PUBLICATIONS

"Transflex TM", Sierracin Corp. Copyright 1979.

Primary Examiner—John W. Caldwell, Sr.
Assistant Examiner—Tyrone Queen
Attorney, Agent, or Firm—D. A. N. Chase

[57] ABSTRACT

This invention is an input device that enables the user to take symbol sequences such as whole words, phrases, sentences, paragraphs, or other multi-symbol sequences from a computer's memory and have these symbol sequences printed out or displayed by some other means such as a computer monitor. This invention uses a grid of points of switch closure, where each point is identified by an alphanumeric or other code; and where each point of switch closure can be individually activated by the user. Printed sheets of material are accurately positioned over this grid of switch closure points. Printed on these sheets of material are: 1, symbol sequences; and 2, response areas adjacent to each symbol sequence. Each response area lies over one of the switch closure points. When a switch closure point is activated by the user, the electronically coded grid of coordinates for that point are sent to the computer's memory where this particular code causes the computer's memory in conjunction with other hardware to print out or display the same sequence of symbols as are printed on the sheet adjacent to the response area that was activated by the user.

By input means, the user may indicate that the sequences of symbols are to be typed out, or are to be displayed on a monitor, or are to be processed in some other manner. The sequences of symbols entered by the user by this process can be mixed with symbol sequences entered by the user by other processes such as a keyboard. After the user has developed his sequences of symbols from this and other sources of input, these symbol sequences can be edited, deleted, or modified in a standard word processing manner.

27 Claims, 7 Drawing Sheets

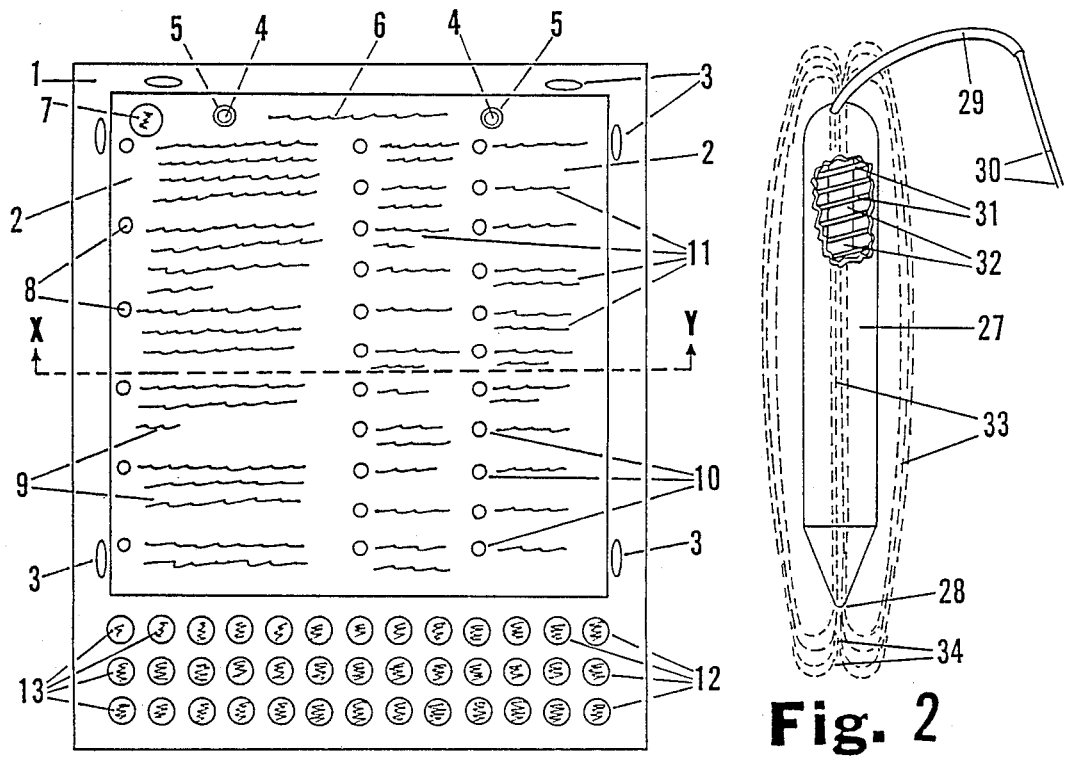
Fig. 1
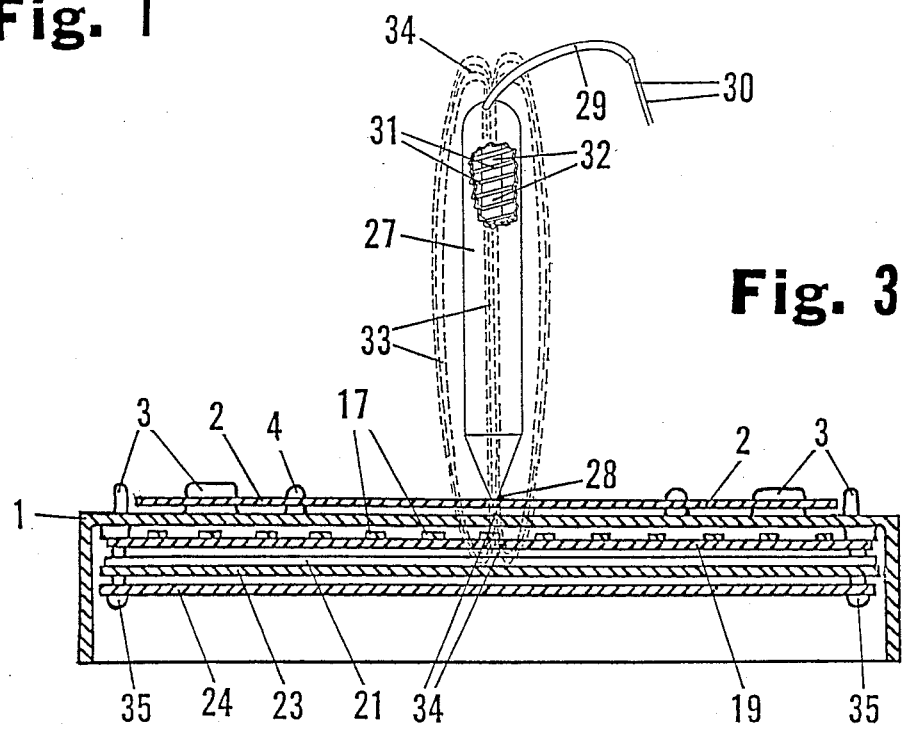
Fig. 2
Fig. 3

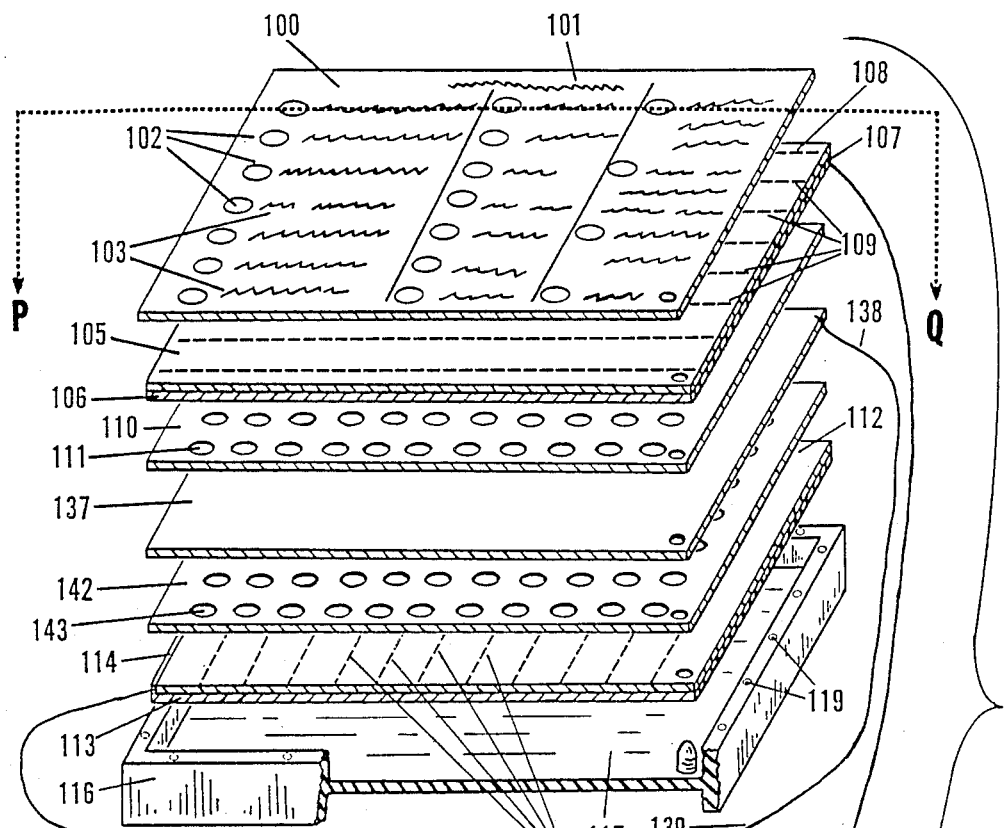
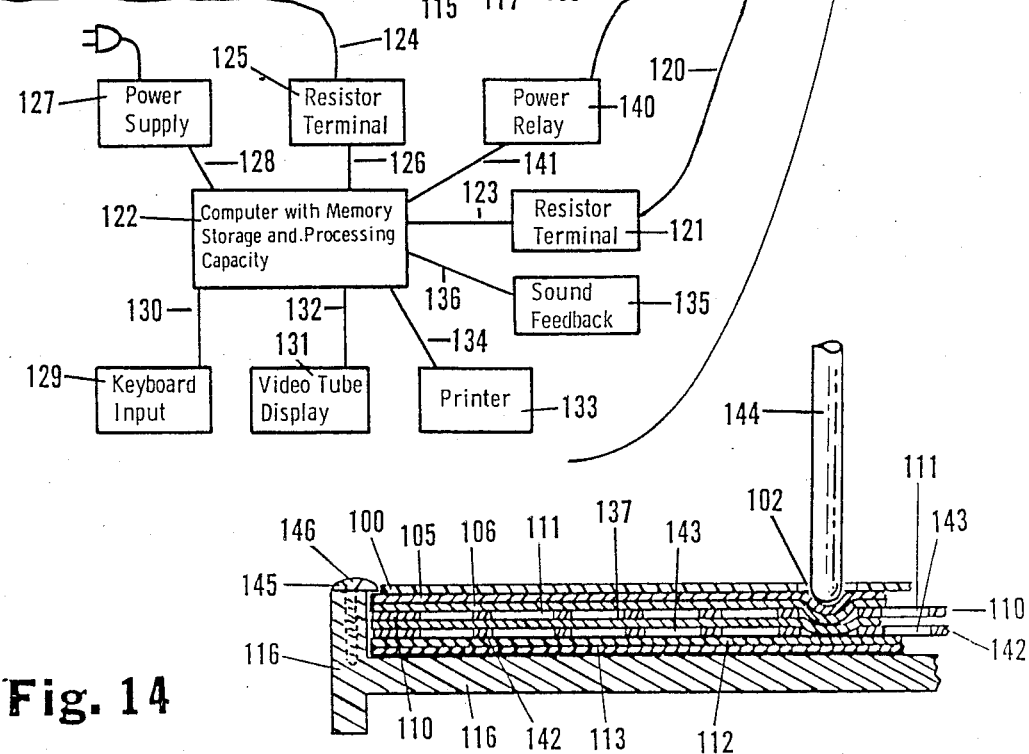
Fig. 13
Fig. 14

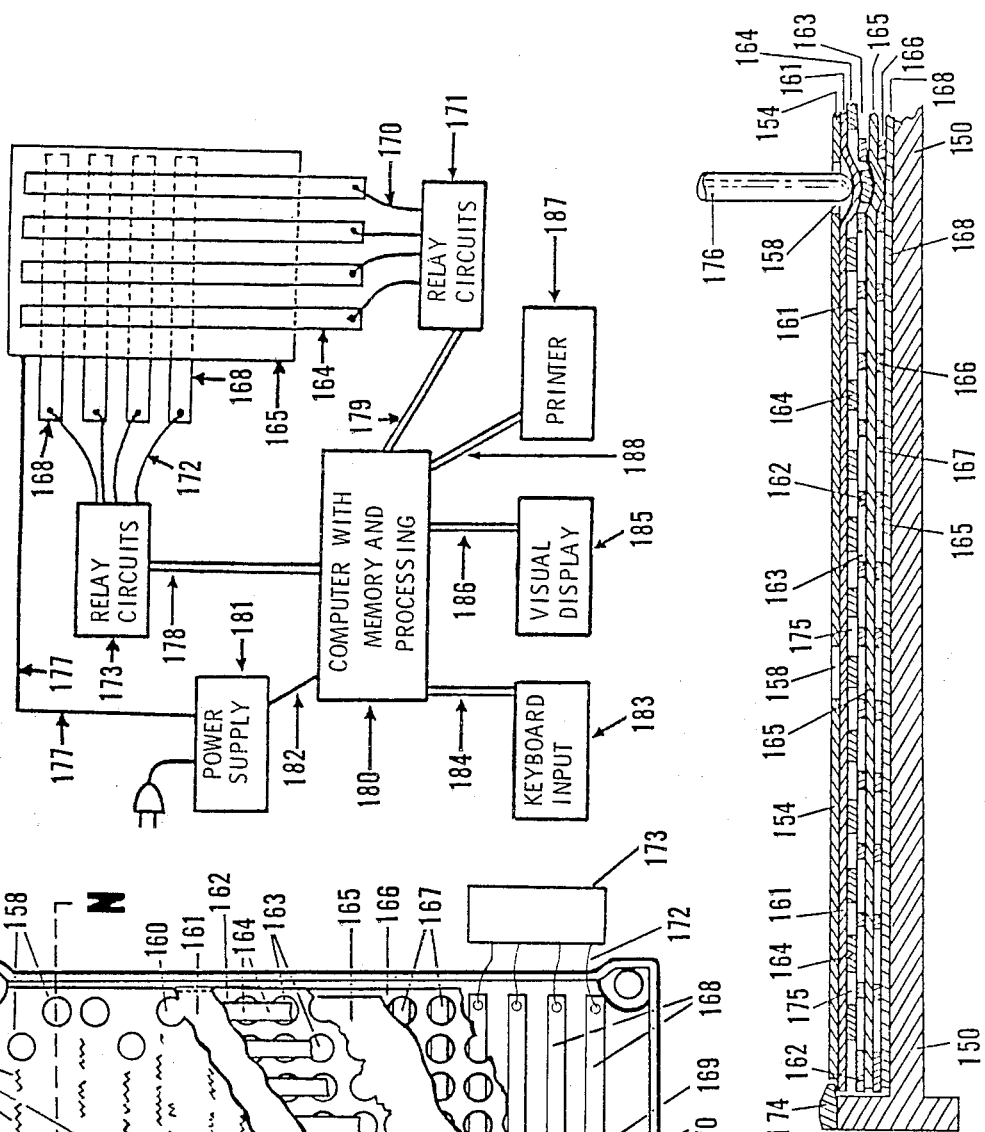
Fig. 17
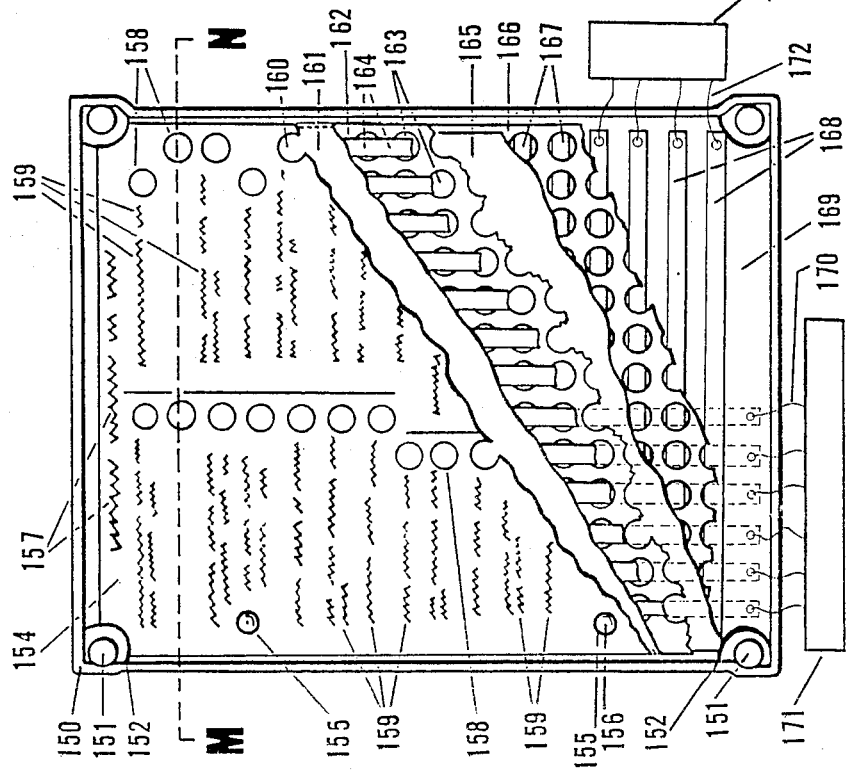
Fig. 15
Fig. 16

INPUT MECHANISM FOR WORD PROCESSOR

BACKGROUND: INPUT DEVICES FOR ELECTRONIC DATA PROCESSING - WORD PROCESSING

In 1887 Dr. Herman Hollerith introduced and developed the idea of a punched card to help process the data from the U.S. 1880 census which had not been processed by 1887 by the use of hand tabulation methods. Dr. Hollerith is viewed as the father of current keypunch and computer input methods.

In 1965 Mohawk Data Services introduced a method of transferring alphanumeric symbols from a typewriter keyboard directly to magnetic tape.

In 1969 IBM developed a new and smaller type of keypunch card for its System 3 computer.

Since the 1960's other data processing input devices have been developed, and information is now more likely to be stored on a magnetic disc than on a magnetic tape due to more rapid access from a disc of symbolic and other codes.

Though a typewriter type keyboard is still the most common means to put information into an electronic data processing system; there are a variety of other processes available which include; optical scanning devices; magnetic ink character recognition (MICR) readers; optical character recognition (OCR) readers; "Mark Sensitive Devices" that can read hand writing or printed and typed paper documents; readers of laser encoded photographic plates; laser readers of colored photographs; "mice"; "joy sticks"; point of service input as by cash registers; and "Touch Tone" input that uses a portable pad with 12 keys to input into a computer via any telephone.

Some input devices have "smart terminals" that have their own integrated microprocessors process input within the input device before relaying it on for further processing within a computer.

A review of the literature on computer peripherals and computer input devices; and a review of the U.S. Patent Abstracts for Class 364-Electrical Computers and Data Processing Systems; Subclasses: 188-With Operator Control Interface Control Display Module; 189 Keyboard; and 190-Positional (Joystick); fails to reveal a computer input mechanism similar to this invention. This inventor has filed for U.S. Patents on computer input mechanisms that are used as teaching and testing apparatus, and has been granted U.S. Pat. Nos. 4,521,199, and 4,522,599; with several similar patent applications still pending. With only slight modification, and with a different format of programming, the inventions covered by the above patents and related patent applications can be adapted to the invention covered in this patent application.

SUMMARY: INPUT MECHANISM FOR WORD PROCESSOR

One of the problems with the standard typewriter type keyboard that is used with most existing computers as that standard input means is that the user puts only one symbol at a time into the computer or other electronic data processing mechanism. Word processors allow the user to store what has already been typed into the computer or related mechanism, and to edit, modify, delete, reposition, and reuse what has already been typed in from a keyboard or inputted by other means.

In this invention the activation of single switches from a pattern of switches is used to input single symbols or multiple symbols such as whole words, phrases, sentences, or paragraphs into an electronic data processor by the adaptation of an existing technology to this purpose. In this existing technology there are a number of different ways of which the points of intersection of the vertical and horizontal coordinates of a grid pattern (or other pattern) can be identified in alphanumeric or other computer codes. Switch closure at the points of intersection of two different coordinates are currently being used in a variety of ways: such as to draw graphics on a cathode ray tube, or to use a "plotter" to draw a detailed drawing as in (CAD) computer aided design; or to designate correct and incorrect answer response areas as in the previously noted patents granted to this inventor.

This invention uses a pattern of switches, with a grid pattern preferred for at least a part of the pattern, where these switches are located at the points of intersection of the vertical and horizontal coordinates of a grid, and where these points of closure are identified by alphanumeric or computer language codes; where the user can select the particular point or points the user desires; in the sequence that the user desires; where said point or points correspond to specific single symbols, or where one point corresponds to multiple symbols such as one word, or a phrase, or a sentence, or a paragraph; and where the user selects a sequence of points in this pattern of points of intersection of grid coordinates; and where this sequence of points allows the user to construct larger words, phrases, sentences, paragraphs, or other sequences of symbols to fulfill certain user needs.

In this invention, the different contact points in this pattern of switch points has specific single symbols or multiple symbol sequences assigned to the individual points of contact. Printed overlay sheets are positioned above the pattern of switch points. Printed on the overlay sheets are a number of user response areas. Each user response area lies immediately above a switch contact point. Adjacent to each user response area is a sequence of symbols or other indicia. Each point in the pattern of points has an alphanumeric or other code assigned to that point. When that switch point is activated electric circuits send the code assigned to that point to a computer for processing within the computer. The computer's memory has been programmed to recognize the different codes, and to display by visual means or by sound output the multiple symbol sequence or other indicia assigned to that particular switch contact point.

This invention can be constructed in two variations. In the first variation, this mechanism can "stand alone" in that not only are multiple symbol sequences printed adjacent to user response areas, but a part of the pattern of switch contact points is designated for single symbols and other input and control functions in the manner of a computer's typewriter like keyboard with clusters of adjacent keys for a variety of control functions. In the second variation of this invention, most of the pattern of "user response areas" that overlie switch contact points are used for multiple symbol sequence input into the computer, and single symbols and other indicia are inputted by a computer's keyboard. In both variations, printed overlays are accurately positioned above the pattern of switch closure points so that each "user response area" lies immediately above one of the switches in the pattern of switch closure points. In both variations multiple symbol sequences and other indicia are printed adjacent to user response areas on the overlays. (By using printed overlays that have many "blank" or unprinted areas adjacent to a user response area, a user can print, write, or type their own multiple symbol sequences on these incompletely printed overlays, and can also program the computer to print out the multiple symbol sequences the user has written on the overlays and entered into the computer.)

In both variations of this invention (the first variation that does not require a computer's keyboard, and the second variation that does require a computer's keyboard), the computer's memory is programmed to display the multiple symbol sequences when that particular user response area and its underlying switch(es) are activated. This multiple symbol sequence may first be displayed on a visual display means such as a cathode ray tube (a video monitor), or certain spoken word sequences may be presented. When a visual display sequence is presented on a monitor, it can be added to, modified, or edited prior to the user requesting that the computer and attached computer hardware print out the desired symbol sequences.

In this invention, three main ways are presented by which these two variations of this invention can be attained. The first way is by the use of a grid of conductive strips and a hand held electromagnetic probe. The second way is by downward pressure on two sets of conductive strips (two such ways are presented). The third way is by the use of two electroresistive sheets. (In all three ways of causing switch activation, the computer's memory has been programmed to know what symbol sequences are to be displayed or printed out at a given site of switch activation).

BRIEF DESCRIPTION OF THE DRAWINGS:

FIGS. 1, 2, 3, 4, and 7, illustrate the way that switch activation can be atained by the use of a hand held electromagnetic probe at sites of switch closure.

FIGS. 8, 9, 10, 15, 16, and 17 show how conductive strips that are arranged in two sets, one above the other can be activated by downward pressure to form sites or points of switch closure.

FIGS. 11, 12, 13, and 14 show how two electroresistive sheets can be used to form the grid coordinates of a pattern of switch closure points that can be activated by downward pressure at the different sites of switch closure.

FIG. 1 is a top view of a holding frame which contains a grid of conductive strips and which has located at its upper surface: (1) a printed overlay that has printed on its surface response areas adjacent to multisymbol sequences; and (2) an area designated for individual alphanumeric and other individual symbols.

FIG. 2: FIG. 2 is a hand held probe that emits an electromagnetic field that is used to activate conductive strips.

FIG. 3: FIG. 3 is a cross sectional view taken from along broken line X-Y in FIG. 1, and also shows how the probe in FIG. 2 is used to activate different circuits.

FIG. 4: FIG. 4 is a partly cut away view of FIG. 1, that shows the relationship of the different components, and shows how a number of different printed overlays can be positioned one above the other in tablet or notebook like form.

FIG. 5: FIG. 5 shows two sets of conductive strips, with one set in a zig-zag pattern, and this results in a non-grid pattern.

FIG. 6: FIG. 6 shows two sets of conductive strips, with one set that is curvilinear, producing a non-grid pattern.

FIG. 7: FIG. 7 shows the conductive strips from FIG. 1, and the hand held probe from FIG. 2, and their relationship to microprocessing circuits, integrating circuits, and a computer and related hardware.

FIG. 8: FIG. 8 is a partly cut away top view of the second way that two sets of conductive strips can product a switching action. This way requires downward pressure at the switch site.

FIG. 9: FIG. 9 is a cross sectional view takn from along line V-W in FIG. 8, and shows a hand held stylus effecting switch closure by downward pressure at the response site.

FIG. 10: FIG. 10 is a schematic view of the vertical and horizontal conductive strips in FIGS. 8 and 9, and shows the schematic relationships of these strips to the means by which input from them is processed, and how this is linked to a computer and related hardware.

FIG. 11: FIG. 11 is an "exploded view" plus a schematic drawing of related circuits, a computer, and computer hardware of one way in which two electroresistive sheets are used to determine the vertical and horizontal coordinates of a grid.

FIG. 12: FIG. 12 is a partial cross sectional view taken along line S-T in FIG. 11, and shows a stylus exerting downward pressure to effect switch activation at a response site.

FIG. 13: FIG. 13 is similar to FIG. 11 in most respects, but presents the second way that two electroresistive sheets may be used to obtain grid coordinates.

FIG. 14: FIG. 14 is a partial cross sectional view taken from along broken line P-Q in FIG. 13, and is similar in most respects to FIG. 12 except for the different manner of ataining a switching action from two electroresistive sheets.

FIG. 15: FIG. 15 is a partly cut away view that is similar to FIG. 8, but shows a highly conductive sheet located between the two sets of conductive strips; and downward pressure at a response site causes one conductive strip in each set to contact this highly conductive sheet.

FIG. 16: FIG. 16 is a cross sectional view along broken line M-N in FIG. 15.

FIG. 17: FIG. 17 is in many ways similar to FIG. 10, except FIG. 17 shows a highly conductive sheet between the two sets of highly conductive strips.

Figure 4:
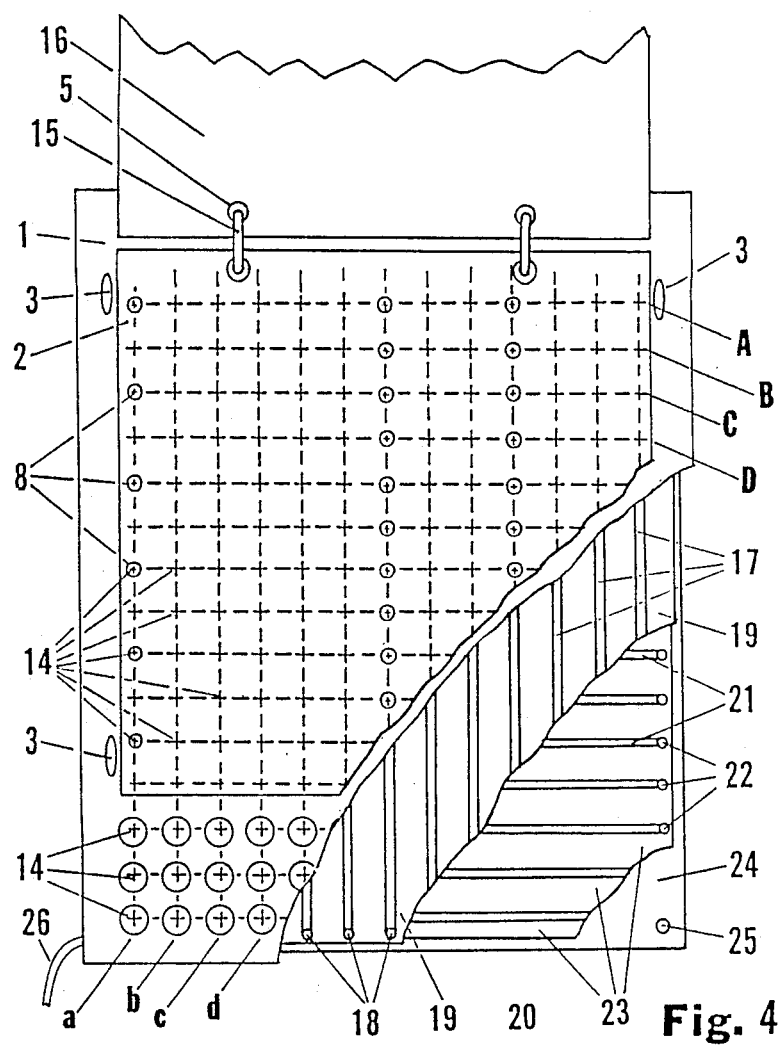

DETAILED DESCRIPTION OF THE DRAWINGS:

FIG. 1: In FIG. 1, 1 is a holding frame on top of which is positioned an overlay 2. Protruding upward from the upper surface of holding frame 1, are positioning posts 3, and positioning pegs 4. Printed overlays 2 have through holes 5 punched in them. Through holes 5 fit over positioning pegs 4 to assure proper positioning. Positioning pegs 4 and positioning posts 3 assure proper allignment of overlays 2 on holding frame 1. Printed on overlays 2 are response areas 8 and 10, and symbol sequences 9 and 11. Printed or embossed on, or molded into the surface of holding frame 11 are individual symbols 13 of alphanumeric or other type, and these are located within response areas 12. A keyboard on holding frame 1 may be substituted for these response areas 12 for more rapid input of single symbols.

FIG. 2: FIG. 2 shows a hand held electromagnetic probe 27 whose magnetic field 33 is most concentrated at tip 28 to produce concentrated lines of force 34 beneath tip 28. When electrical currents pass through wires 30 and into cable 29 and activate coil of wire 31 that has iron core 32 that produces a magnetic field 33 which is picked up by underlying conductive strips.

FIG. 3: FIG. 3 shows the probe in FIG. 2 with its magnetic field 33 positioned above a cross sectional view of FIG. 1 that has been taken from along broken line X-Y in FIG. 1. In FIG. 3, holding frame 1 has protruding upward from its surface positioning posts 3 and positioning pegs 4. Positioned on top of holding frame 1 is overlay 2 which contains multisymbol sequences that are printed, written or typed. Immediately beneath the upper surface of holding frame 1 are vertical conductive strips 17 which are attached to nonconductive sheet 19. Beneath sheet 19 are horizontal conductive strips 21 which are attached to nonconductive sheet 23. Underlying nonconductive sheet 23 is conductive sheet 24 that serves a grounding and concentrating function for the electromagnetic field of pulses 33. Fastner 35, a self threading screw, holds these components in position beneath the upper surface of holding frame 1.

FIG. 4: FIG. 4 is a partly cut away view of FIG. 1 with broken lines to show a grid pattern, and that shows a different way of holding the overlays 2 on the upper surface of holding frame 1 by the use of a loop steel hinge 15. In FIG. 4, horizontal broken lines: A, B, C, D, etc., intersect with vertical broken lines: a, b, c, d, etc., to form a grid pattern with points of intersection 14 overlying the points of intersection of vertical conductive strips 17 and horizontal conductive strips 21. It will be noted that all response areas 8 on overlay 2 have their centers in common with points of intersection 14. This assures that when the user places the tip 28 of electric probe 27 over a response area 8 or 10 (see FIG. 1), electromagnetic field 33 will have its maximum lines of force 34 at one of the points of intersection of a vertical conductive strip 17 and a horizontal conductive strip 21. The back side of printed overlay 2 is designated as 16 in this figure. Also illustrated in this figure are that vertical conductive strips 17 have terminal endings 18, and horizontal conductive strips 21 have terminal endings 22. Through hole 25 in conductive sheet 24 allows for the passage of fastner 35 (see FIG. 1). Cable 26 exits from one corner of holding frame 1, and contains the electrical conductors from terminal endings 18 and 22.

Figure 5:
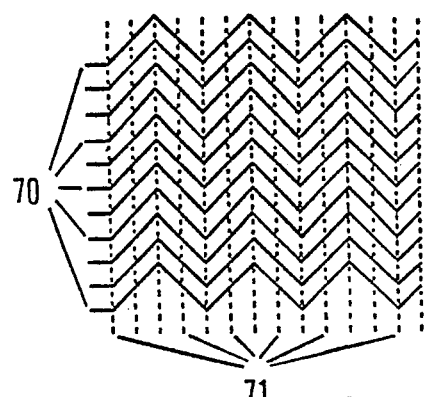
FIGS. 5 and 6 show how conductive strips can be arranged in a non grid pattern.

FIG. 5: FIG. 5 illustrates a pattern of conductive strips where one of the sets of conductive strips 70 is in a zig-zag pattern. Thus though the simplest and preferred pattern of conductive strips is to have one set with a vertical axis, and the second set with a horizontal axis to form a grid pattern, other points of intersection from nongrid patterns of conductive strips may be used with this invention.

Figure 6:
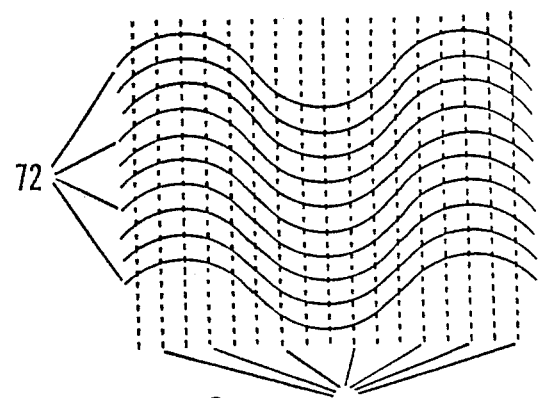

FIG. 6: FIG. 6 illustrates another pattern of arrangement of conductive strips where one set of conductive strips 72 follows a curvilinear pattern and the second set of conductive strips 73, follows a vertical pattern. This curvilinear set of strips illustrates still another way in which one or both sets of conductive strips may be arranged in a nongrid pattern to form points of intersection that can be used as switch closure points from two different sets of conductive strips, one set being above the other.

Figure 7:
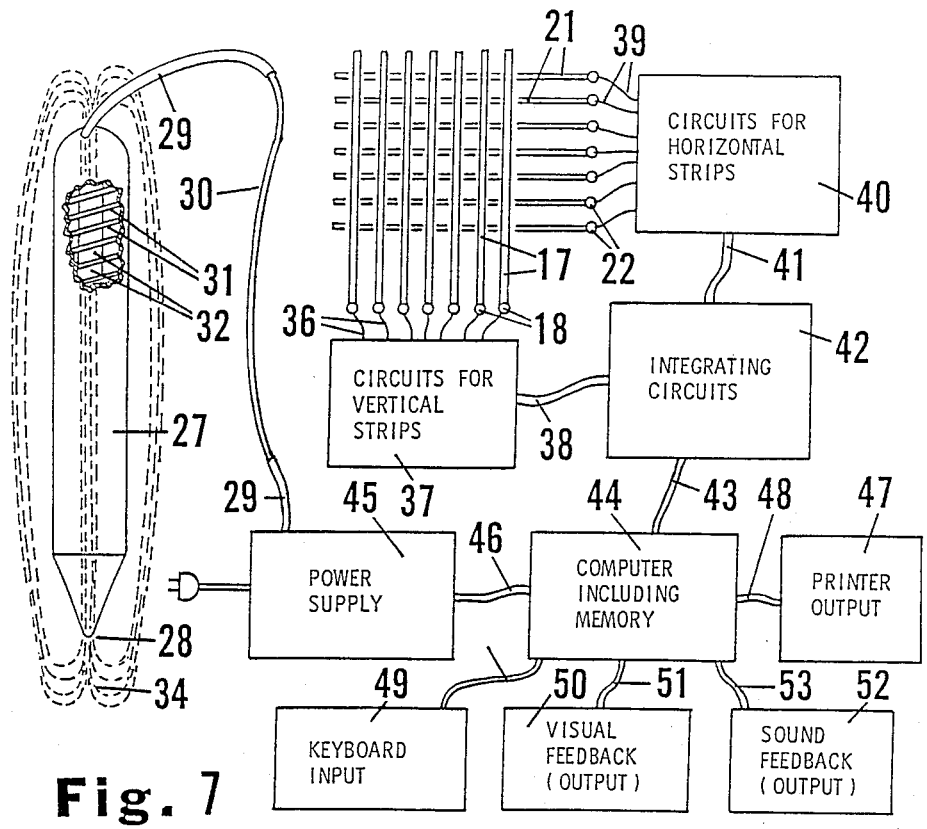

FIG. 7: FIG. 7 shows the electrical - schematic relationships between hand held probe 27 that emits magnetic field 33, and the two sets of conductive strips; vertical set 17, and horizontal set 21, and to the computer 44 and its related hardware, including power supply 45. Conductive strips 17 have terminal endings 18 that are connected to circuits for vertical strips 37 by electrical connectors 36. Conductive strips 21 have terminal endings 22 which are connected to circuits for horizontal strips 40 by electrical conductors 39. Circuits for horizontal strips 40 connects to integrating circuits 42 by way of cable 41. Circuits for vertical strips 37 connects to integrating circuits 42 by way of cable 38. Integrating circuits 42 is linked to computer 44 by way of cable of conductors 43. Power supply 45 supplies power to various computer hardware items by way of computer 44 and cables 46, 43, 41, 38, 51, and and unlabled cable to keyboard input 49. Printer output 47, sound feedback 52, and visual feedback 50 are linked to computer 44 by conductor cables 48, 53, and 51.

FIGS. 1 through 7 illustrate one variation of this invention where both individual symbols and sequences of symbols that are stored in a computer's memory are activated by switch closure from a pattern of switches where some of these switches underlie an overlay sheet 2 that has response areas 8 printed or written on its surface, and where other response areas that indicate individual symbols of alphanumeric or other type are permanently printed, embossed, or molded into the surface of this invention. This first variation combines response areas that elicit from the computer's memory multiple symbole sequences by the activation of one response area and also response areas that are organized like a keyboard entry mechanism where one alphanumeric or other symbol is entered at a time. FIGS. 1 through 7 illustrate how this can be done with an electromagnetic probe by the use of its magnetic field to produce a switching action in conductive strips that lie under the surface of the holding mechanism. It is also understood that by extending the overlay to cover the entire "working surface" of the holding mechanism, that permenent individual symbols need not be printed, embossed, or molded on the upper surface of the holding mechanism, but that the printed overlays may contain these individual symbols printed on their surface. It is also understood that any variety of symbols (individually or in combination) that can be printed by a dot matrix or other type of printer can be assigned to any response area. This allows an individual to program their own single and multi symbol sequences and to prepare their own overlays with symbol sequences that correspond to what they have programmed into the computers memory.

The second variations of this invention is similar to the first, but it uses all of the response areas on the upper surface of the holding frame for multisymbol sequences, and uses the keyboard input mechanism of a computer as the source of single or individual symbol input, (this is illustrated in FIGS. 11, 12, 13, and 14).

Figure 10:
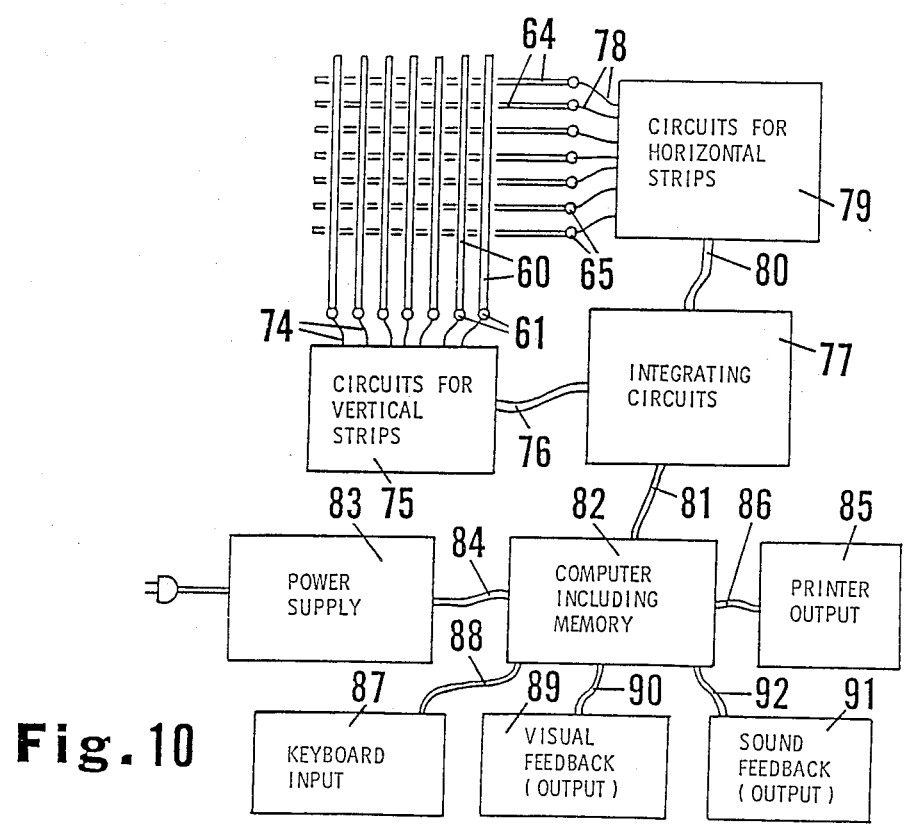
Figure 8:
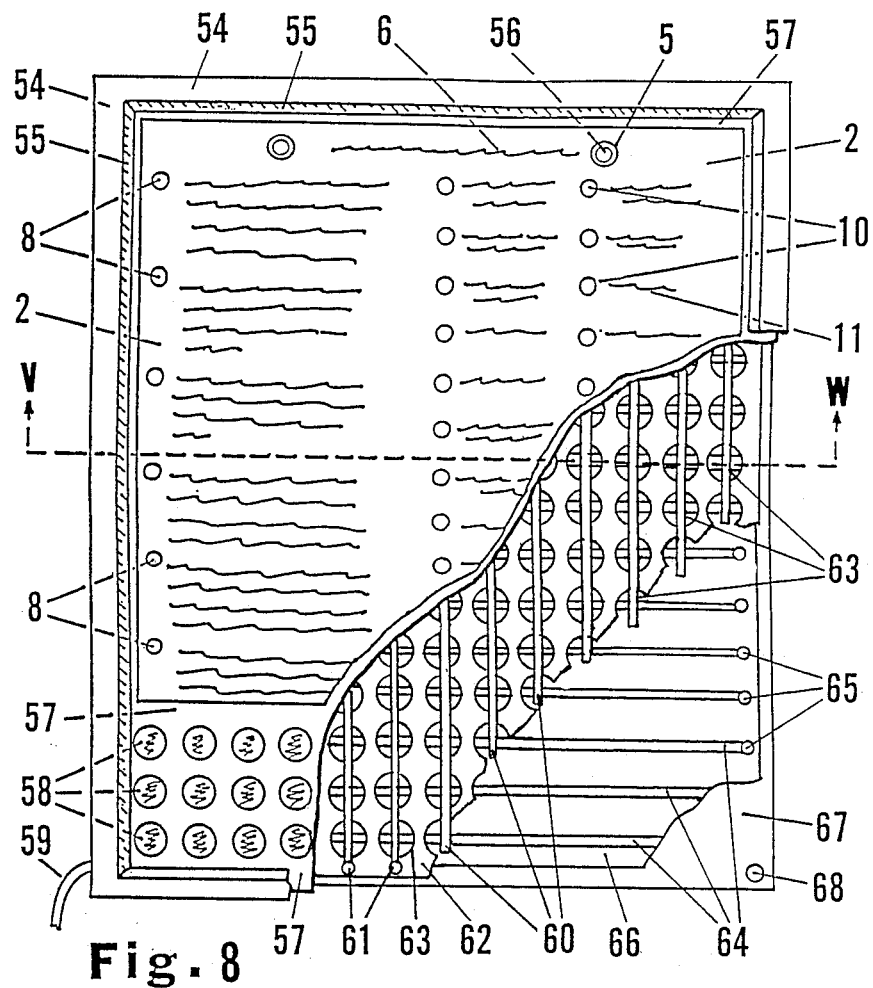
Figure 9:
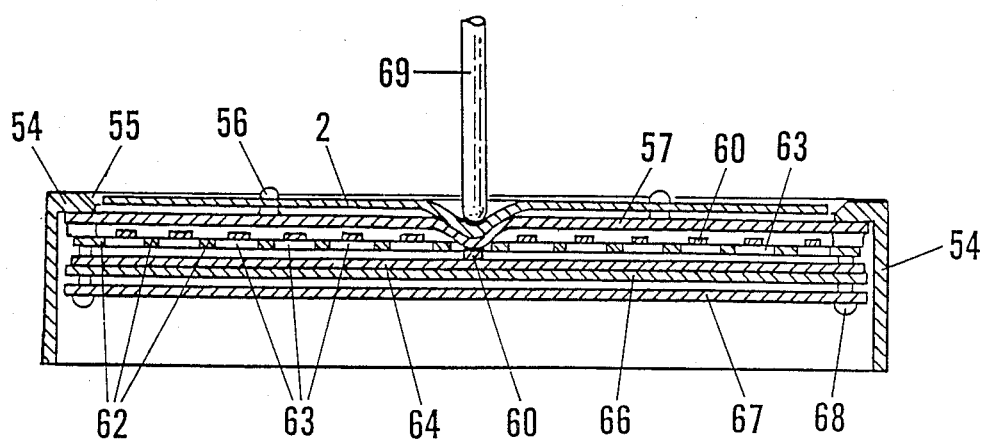

FIGS. 8, 9, and 10 show the second way that a pattern of switches can be used to activate a computers memory to produce multi symbol sequences by the activation of one response area. FIG. 8: In FIG. 8, overlay 2 is similar in all respects to overlay 2 in FIG. 1, and has two positioning holes 5, response areas 8 and 10, and multiple symbol sequences 11 adjacent to response areas 10. In FIG. 8, overlay 2 lies on a flexible non conductive sheet 57, and is held in proper position by positioning pegs 56 and inclined walls 55 of holding frame 54. Response areas 58 may contain single symbols or multiple symbols, or may be direction and control response areas for editing, word processing, or other input functions. Beneath flexible nonconductive sheet 57 are vertical conductive strips 60 which have terminal endings 61. Vertical conductive strips 60 are flexible, and have their centers in the same vertical axis as the centers of through holes 63 in nonconductive sheet 62. Conductive strips 64 are nonflexible and are bonded to nonconductive sheet 66, have terminal endings 65, and have their centers on the same axis as the horizontal centers of through holes 63 in nonconductive sheet 62. Bottom plate 67 is a support plate that shows a through hole 68 in one corner. Sheets of material: 57, 62, and 66 have similar through holes in each corner, which with the help of fasteners 68-A keeps these sheets and conductive strips in proper allignment within holding frame 54, and beneath overlay 2. (See FIG. 9.)

FIG. 9: FIG. 9 is a cross sectional view taken along broken line V-W in FIG. 8 to reveal the top to bottom relationships of the different components of this second way of obtaining a pattern of switches. FIG. 9 also shows how downward pressure by a stylus at a response area 8 or 10 by a stylus 69 (or by one's finger tip) results in a switch closure as the tip of stylus 69 deflects sheets 2 and 57 in a downward direction and pushes a vertical conductive strip 60 through a through hole 63 in sheet 62 to contact a conductive strip 64 at the site of downward pressure.

FIG. 10: FIG. 10 shows the electrical - schematic relationships between: vertical conductive strips 60; horizontal conductive strips 64; circuits for processing inputs from these two sets of strips; the computer 82 and its related hardware; power supply 83; and connecting conductors and cables. Conducting strips 60 have terminal endings 61 which are linked to circuits for vertical strips 75 by conductors 74. Horizontal conducting strips 64 have have terminal endings 65 which are connected to circuits for horizontal strips 79 by conductors 78. The circuits for the horizontal and vertical strips 79 and 75 are linked to the computer 82 by way of cables 80, 76, and 81 and by integrating circuits 77. Power supply 83 is linked to computer 82 by cable 84 and to other computer related hardware by cables 81, 86, 88, 90, and 92. These same cables link other computer functions to integrating circuits 77, printer output 85, keybord input 87, visual feedback 89, and sound feedback 91.

FIGS. 8, 9, and 10 illustrate the first variation of this invention in which both individual symbols and multiple symbol sequences that are stored in a computer's memory are activated by downward pressure at a response area. FIG. 8 shows two types of response areas; response areas 8 and 10 that are printed on an overlay, and response areas 58 that are printed on flexible nonconductive sheet 57. In useing this mechanism in the first variation, response areas 58 would be assigned single symbols such as the letters and numbers on a computer keyboard, and also assigned other keyboard input functions. In the second variation of this invention, overlay 2 would cover all of the response areas formed by the grid of conductive strips and these response areas would be primarily used for multiple symbol sequence activation and the keyboard from the computer would be used as the input source for single alphanumeric symbols and other computer keyboard functions. This second way (e.g. downward pressure on conductive strips to close a switch) of having a grid of switches provide response areas also allows the user to program the computer's memory with multiple symbol sequences, and to assign a different response area 8 or 10, to a particular multiple symbol sequence.

Figures 11, 12:
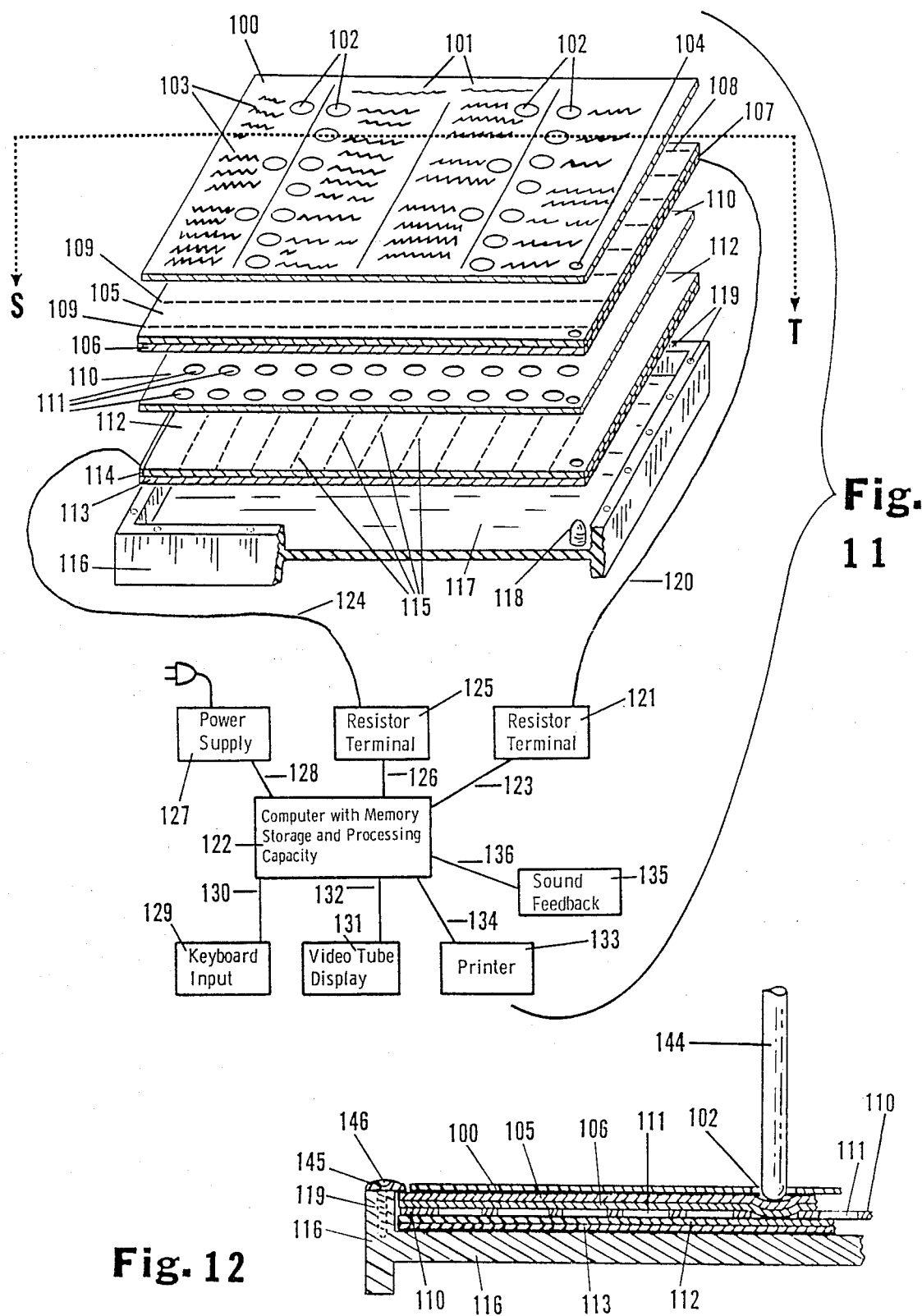

FIGS. 11, 12, 13, and 14 illustrate a third way of activating response areas to provide a grid of coordinates that are assigned to single and/or multiple symbol sequences. This third way uses two electroresistive sheets to determine grid coordinates. Two slightly different ways are illustrated in FIGS. 11 and 12, and in FIGS. 13 and 14; and these two different ways are described in the following paragraphs.

FIG. 11: FIG. 11 shows one way that electroresistive sheets are used to provide a grid of vertical and horizontal coordinates that can act as switch closure sites. FIG. 11 shows an "exploded" view of all of the components except for a stylus that exerts downward pressure, and this is shown in FIG. 12. FIG. 11 also includes a schematic view of the manner in which inputs from the two electroresistive sheets are linked to computer 122 and its related hardware. In FIG. 11, 100 is an overlay that has printed on its upper surface a title 101, response areas 102, and multiple symbol sequences 103. Overlay 100 has through hole 104 which is an orienting and positioning hole which fits over positioning peg 118 which protrudes upward from the inner upper surface of holding frame 116. In FIG. 11, 105 is a flexible nonconductive sheet that has an electroresistive sheet or film 106 bonded to its under surface. Attached horizontally along one edge of electroresistive sheet 106 is a strip of highly electroconductive material 107. Broken line 108 which appears on the upper surface of nonconductive sheet 105 indicates the position of the leading edge of conductive strip 107 as it passes under nonconductive sheet 105. Broken lines 109 that parallel broken line 108 at set intervals indicate increments of distance away from line 108, and indicate how an electroresistive sheet of uniform characteristics that has a straight line conductive strip such as strip 107 attached along one edge will have gradients of electrical resistance that are directly proportional to the distance from that conductive strip. These gradients of resistance can be used as the two axes of a grid pattern composed of vertical and horizontal coordinates when two different electroresistive sheets with conductive strips attached along one edge are positioned one above the other in parallel planes. In FIG. 11, these two electroresistive sheets are indicated by the numbers 106 and 112, and the horizontal conductive strip of sheet sheet 106 is numbered 107 (and is largely hidden), and the vertical strip of sheet 112 is labled 114 and its leading edge can be observed in FIG. 11. Placed between electroresistive sheets 106 and 112 is a nonconductive sheet 110 that has through holes 111 in it, and these holes 111 are placed in a grid pattern. Through holes 111 have centers in common with all actual and potential response areas 102 on overlay sheets 100. Gradients of electrical resistance 115 on electroresistive sheet 112 are indicated by parallel vertical broken lines. The degree of electrical resistance in sheet 112 is directly proportional to the distance away from the leading edge of conductive strip 114. The gradients of electrical resistance in sheet 106 and sheet 112 are indicated by broken lines 109 and 115. Broken lines 109 and 115 represent the centers of vertical and horizontal axes of response areas 102 and through holes 111. To "fine tune" this apparatus so that each response area can be identified by a separate summing of two different electrical resistances, the electrical resistance per given surface distance on one electroresistive sheet can be much greater than the other, and also the through holes 111 in nonconductive sheet 110 can be varied in size. As some electroresistive films and sheets are fragile and easily ruptured or deformed, electroresistive sheet 112 is bonded to a nonconductive sheet 113. Overlay sheet 100, and sheets 105, 106, 110, 112, and 113 all nest within the walls of holding frame 116, and nest in layers on the upper surface 117 of holding frame 116. All of the above sheets have a through hole in the lower right hand corner that fits over positioning peg 118. Holes 119 in the upper outer edges of holding frame 116 indicate the site where conventional screw fasteners 146 will attach an upper rim member 145 to the holding frame (see FIG. 12 for details). Upper outer rim 145 has an overhanging lip that captures and retains sheets 105, 106, 110, 112, and 113 within the inner walls of holding frame 116. Overlay sheet 100 is slightly smaller in size than sheets: 105, 106, 110, 112, and 114; and overlay sheet 100 is held in position on top of sheet 105 by positioning peg 118 and the inner edges of upper outer rim 145. In FIG. 11, 120 is an electrical conductor that connects conductive strip 107 with resistor terminal 121, and 124 is a conductor that connects conductive strip 114 with resistor terminal 125. Resistor terminal 121 is connected to computer 122 by cable 123, and resistor terminal 125 is connected to computer 122 by cable 126. Resistor terminals 121 and 125 in conjunction with the processing capacity of computer 122 are able to locate the vertical and horizontal grid coordinates of sites of downward pressure by a stylus 144 (see FIG. 12) when this downward pressure is at a response area 102 on an overlay sheet 100. Response areas 102 have the same centers as through holes 111, and thus electrical contact or a switching action can occur at these sites. FIG. 11 illustrates the relationships of computer 122: to power supply 127 by way of cable 128; to keyboard input 129 by way of cable 130; to video display 131 by way of cable 132, to printer 133 by way of cable 134, and to sound feedback 135 by way of cable 136.

FIG. 12: FIG. 12 is a partial cross sectional view of the apparatus illustrated in FIG. 11, and is taken from along broken line S-T in FIG. 11. FIG. 12 illustrates the top to bottom relationships of the components illustrated in FIG. 11 that nest within holding frame 116. FIG. 12 also shows screw type fastner 146 holding upper rim 145 to a side edge of holding frame 116. This figure also shows upper rim 145 capturing the nested sheets 105, 106, 110, 112, and 113 within holding frame 116. The response areas 102 on overlay sheet 100 may be printed circles or other geometric shapes, or these response areas 102 may be punched out through holes. FIG. 12 shows a stylus 144 passing through a response area 102 that is a through hole in overlay sheet 102. Stylus 144 deflects sheets 105 and 106 in a downward direction so that at this site electroresistive sheet 106 passes through a hole 111 in nonconductive sheet 110 to contact electroresistive sheet 112 which results in a switching action, and also indicates the electrical resistive gradients that are transformed into vertical and horizontal grid coordinates that define the site where this switching action occurred.

FIGS. 11 and 12 indicate one way that two electroresistive sheets 106 and 112 are used to locate grid coordinates or response areas 102 on an overlay sheet 100; and where said overlay sheets 100 have printed or written on its surface multiple symbol sequences 103 that are adjacent to response areas 102. The memory of computer 122 has been programmed so that the activation of a particular response area 102 will activate the same multiple symbol sequence as is located in the adjacent written or printed symbol sequence 103; and that these multiple symbol sequences will be displayed on a cathode ray tube (video display 131) or by another type of visual display means, and may also be printed out by print out 133, and may be added to or modified or deleted by the use of inputs from computer keyboard 129. FIG. 11 shows only response areas 102 being used for multiple symbol sequences, however it is understood that some response areas 102 may be temporarily or permanently assigned single symbols in a manner described for the two previous ways of of locating and assigning response areas noted in FIGS. 1 through 10 and in the description that accompanies these drawings.

FIGS. 13 and 14 are in most ways similar to FIGS. 11 and 12. However in FIGS. 13 and 14 there are two additional sheets in the lamination of sheets: a flexible highly electroconductive sheet 137 and a nonconductive sheet 142 that has a grid of through holes 143. This arrangement permits the processing of the resistances from the two electroresistive sheets 106 and 112 as separate resistances, rather than summing these two resistances as is one of the ways of processing the resistances in the apparatus as illustrated in FIGS. 11 and 12.

FIG. 13: FIG. 13 is an exploded view plus a schematic of this other way of processing input from two electroresistive sheets 106 and 112. Many of the components and relationships illustrated in FIG. 13 are similar to, or identical with the components and relationships illustrated in FIGS. 11 and 12. In FIG. 13, 100 is an overlay sheet that contains a title 101, response areas 102, and multiple symbol sequences 103 that are adjacent to response areas 102. Flexible electroresistive sheet 106 is bonded to the under surface of elastic nonconductive sheet 105. A linear conductive strip 107 is attached along one of the horizontal edges of sheet 106 and the leading edge of strip 107 is indicated by broken line 108. Other broken lines 109 are parallel with leading edge 108, and are at set distances from leading edge 108. Underlying electroresistive sheet 106 is nonconductive sheet 110 with a grid of through holes 111. Underlying sheet 10 is flexible and highly conductive sheet 137 that is attached to power relay 140 by conductor 138. Underlying sheet 137 is a second nonconductive sheet 142 that has a grid of through holes 143. Grid of holes 143 have the same centers as do grid of holes 111, and as do the response areas 102 that appear on or in overlays 100. Underlying sheet 142 is electroresistive sheet 112, which is in turn bonded to nonconductive sheet 113. Sheets 100, 105, 106, 110, 137, 142, 112, and 113 all nest within the walls of holding frame 116 (This is best illustrated in FIG. 14.) FIG. 13 shows how conductive strip 107 is linked to resistor terminal 121 by conductor 120 and how conductive strip 114 is linked to resistor terminal 125 by conductor 124. Electrical input via sheet 137 is transmitted to electroresistive sheets 106 and 112 by downward pressure at a response area 102 on an overlay sheet 100 by a stylus 144 or by a similar means of exerting downward pressure. (See FIG. 114 for details.) The two electrical resistances obtained from electroresistive sheets 106 and 112 are processed separately within resistor terminals 121 and 125, and these resistances have values that are assigned different vertical and horizontal grid coordinates. These different grid coordinates illustrated by broken lines 109 and 115 have their centers as centers in common with through holes 143 and 111, and with the response areas 102 that are either printed on or punched in overlay sheet 100. FIGS. 1 through 10 illustrate two other ways of obtaining grid coordinates that can be used as response areas on an overlay sheets. And FIGS. 11 and 12 illustrate a similar and related way that two electroresistive sheets can be used to obtain grid coordinates, when grid coordinates are identified by downward pressure at a response area. As in the previous ways of processing data regarding the grid coordinates, a computer 122 is used to process this data, and attached computer hardware can be programmed to display or print out multiple symbol sequences from the activation of one switching area (response site). And as in previous ways of processing grid coordinates a large number of response areas may be made available by useing a set of overlays that contains a number of different overlay sheets, where each sheet in that particular set uses different response areas 102 on that particular sheet than are used on the other overlay sheets in that same set. It is understood that in this particular method of processing input, that the computer's memory (122) includes the use of "Read Only Memory" insertable cartridges, and floppy disks, and that by the use of different disks and cartridges that different sets of overlays can be used to have quite different sets of multiple symbol sequences used with this apparatus.

This apparatus also permits the use of one language on the overlay sheets, and has the video display screen show the same series of thoughts, statements, or concepts in a different language, and print out this same series of thoughts, statements or concepts in this second language. The symbol sequences displayed on the video screen or printed out in the second language may also be edited, modified, or added to by single symbol input from keyboard input means. Thus this apparatus can be used in translation from one language to another in terms of business correspondance or other types of written communication or communication via telephone lines where one computer "talks" to another, and where symbol print out is the final product of this communication. This translating ability can also be used to enhance the teaching of foreign languages.

FIG. 14: FIG. 14 is a partial cross sectional view taken from along broken line P-Q in FIG. 13. FIG. 13 is in most respects similar to FIG. 11, except that it has two additional sheets in the lamination of sheets. The additional sheets are: conductive sheet 137; and nonconductive sheet 142 that has a grid of through holes 143 penetrating it. These additional sheets are placed between electroresistive sheets 106 and 112, as this lamination of sheets is nested within the inner walls of holding frame 116. The additional of conductive sheet 137 and nonconductive sheet 142 permits resistor terminals 121 and 125 to process the resistance inputs from electroresistive sheets 106 and 112 separately. As in FIG. 11, stylus 144 (or other downward pressure source) exerts downward pressure at response sites 102 on overlay sheets 100. This downward pressure results in two switching actions, the first switching action occurs when sheet 106 contacts sheet 137, and with continued downward pressure, sheet 137 contacts electroresistive sheet 112. The degree of electrical resistance atained from these two switching actions is proportional to the distance from the switching site to the conductive strip that is located along one of the margins of each electroresistive sheet. The two different electrical resistances thus obtained are sent to relay terminals 121 and 124 by conductors 120 and 124. The other functions and relationships of the component parts are described under FIG. 13.

FIG. 15: In FIG. 15, 150 is the holding frame which holds the various elements in position. Overlay sheets 154 are fitted in slots 152 that are at the base of corner posts 151. Overlay sheets 154 have through holes 155 punched in them that permits accurate positioning of different overlay sheets 154 by placing through holes 155 over positioning pegs 156. Printed on overlay sheets 154 is a title 157 and multiple symbol sequences 159. Response areas 158 can either be printed areas on or punched through overlay sheet 154. The cut away view of response area 160 indicates that this response area is a through hole. Nonconductive sheet 161 lies under overlay sheet 154, and also over: conductive strips 164; nonconductive sheet 162; conductive sheet 165; nonconductive sheet 166; conductive strips 168; and surface 169 of holding frame 150. Through holes 163 are in nonconductive sheet 162, and through holes 167 are in nonconductive sheet 166 at all points where individual conductive strips 164 pass across individual conductive strips 168. Conductive strips 164 are attached to relay circuits 171 by conductors 170. Conductive strips 168 are attached to relay circuits 173 by conductors 172.

FIG. 16: FIG. 16 is a cross sectional view along broken line M-N in FIG. 15, that shows the top to bottom relationships of the components described in FIG. 15. FIG. 16 also shows a cap 174 with an overhanging lip holding all of the components within holding frame 150 except for overlay sheet 154 which is removable. FIG. 16 shows space 175 between conductive strips 164, and also shows a stylus 176 exerting downward pressure at a response area 158 to depress: elastic and nonconductive sheet 161; one elastic and conductive strip 164; and conductive elastic sheet 165. This illustration of downward pressure by stylus 176 at a response area 158, shows how two switch contacts are made at the same response area 158. Downward pressure first causes one elastic conductive strip 164 to pass through a through hole 163 to contact an elastic and conductive sheet 165 to close the first switch; and how with continued downward pressure, elastic and conductive sheet 165 passes through a through hole 167 to contact a conductive strip 168 to close the second switch.

FIG. 17: FIG. 17 shows conductive strips 164 overlying conductive sheet 165 which overlays conductive strips 168. This is more clearly illustrated in FIGS. 15 and 16. Conductive strips 164 are attached to relay circuits 171 by conductors 170. Conductive strips 168 are attached to relay circuits 173 by conductors 172. Relay circuits 171 and 173 are attached to computer 180 by cables 179 and 178. Power supply 181 is attached to conductive sheet 165 by conductor 177, and to computer 180 by cable 182. Computer 180 is connected to: keyboard input 183, visual display 185, and printer 187 by cables 184, 186, and 188.

FIGS. 15, 16, and 17 present a way of useing downward pressure at response areas 158 that activate switch sites in an underlying pattern of switches. Though a grid pattern is the preferred pattern, nongrid patterns as are illustrated in FIGS. 5 and 6 can readily be adapted to this way of closing switches at response areas 158.

This additional way of using downward pressure on a pattern of response areas to close switches allows for the use of simpler and less expensive electronic circuitry in the production of this mechanism.

Having thus described two variations of this word processing apparatus that inputs multiple symbol sequences into a computer's memory store for later editing and print out, and having described three different ways to effect multiple symbol sequence input,

What is claimed as new in this invention is:

1. An input apparatus for a word processor comprising:
   a plurality of printed overlay sheets each having user response areas thereon and multiple symbol sequence indicia adjacent each of said response areas,
   holding frame means for receiving a selected overlay sheet and positioning the same in overlying relationship to at least a portion of a number of spaced electrical switching sites presented by a corresponding pattern of electrical sensors, said portion underlying respective user response areas on all of said overlay sheets,
   a programmable computer having a memory in which said multiple symbol sequences are stored,
   means under user control for selecting individual response areas and causing activation of the underlying sensors,
   circuit means interconnecting said pattern of sensors and said computer for identifying the site of each sensor that is activated by the user and assigning a code to each site of sensor activation.
   said memory being programmed to identify the codes assigned to the respective sites of sensor activation underlying user-selected response areas, and further programmed to reproduce the user-selected multiple symbol sequences in response to the identified codes, and
   computer-linked hardware means for displaying the user-selected multiple symbol sequences.

2. The apparatus in claim 2, where the multiple symbol sequence indicia that are on the overlay sheets are in one language, and the multiple symbol sequences that are stored in the computer's memory in response to a given coded input are in a different language, whereby to translate certain standard words, phases, sentences or paragraphs from one language to another.

3. The apparatus in claim 1, further comprising a computer-linked printer for printing out the multiple symbol sequences that the user has selected.

4. The apparatus in claim 1, wherein a part of said pattern of sensors is allocated for additions to, modifications of, editing of, or deletion of the multiple symbol sequences that are displayed.

5. The apparatus in claim 4, wherein said part includes sensors whose activation effects selected computer control functions and single symbol inputs.

6. The apparatus in claim 1, further comprising a keyboard input mechanism for inputting single symbols, computer control input functions, and editing functions to said computer.

7. The apparatus in claim 1, wherein said pattern of sensors comprises a top set and a bottom set of individual conductive strips forming a pattern of points where the individual strips in the top set pass over the individual strips in the bottom set and do not physically contact the individual conductive strips in the bottom set, said user response areas being located on said overlay sheets at corresponding sites where individual conductive strips in the top set pass over individual strips in the bottom set, and wherein said means under user control includes a hand held probe for emitting an electromagnetic field upon activation by the user to induce electric currents in certain of the individual electroconductive strips in both the top and the bottom sets of conductive strips by the user placing a tip of said probe over a user response area, each such area on the overlay sheet in use lying directly over a point where one of the conductive strips in the top set passes over one of the conductive strips in the bottom set, whereby electromagnetic pulses emitted by the hand held probe activates said circuit mean sthat identifies the particular site of activation by producing the assigned code and causing the computer to search its memory for that particular code and to display the corresponding multiple symbol sequence.

8. The apparatus in claim 7, wherein the individual conductive strips in the top and bottom sets of conductive strips from the vertical and horizontal coordinates of a grid pattern.

9. The apparatus in claim 7, wherein one or both sets of conductive strips are curvilinear, zigzag, or otherwise organized in a non-grid pattern.

10. The apparatus in claim 1, wherein said pattern of sensors comprises two sets of individual conductive strips, one of said sets lying over the other set in a plane that is parallel to said other set to present a pattern of switches, downward pressure by said means under user control causing physical contact to be made between one of the strips in the top set and one of the strips in the bottom set resulting in a switching action to which said circuit means responds to identify the site of switch activation by a code, and wherein said computer has in its memory a program whose content corresponds to the multiple symbol sequences on the overlay sheets and the imputting of said codes results in the hardware means displaying the same user-selected multiple symbol sequences that are adjacent the selected user response areas.

11. The apparatus in claim 10, wherein the two sets of conductive strips are arranged in a grid pattern.

12. The apparatus in claim 10, wherein the conductive strips in one or both sets of conductive strips are arranged in a curvilinear pattern, zigzag pattern, or other non-grid pattern.

13. The apparatus in claim 1, wherein said pattern of sensors comprises two electroresistive sheets, one sheet being positioned above the second electroresistive sheet and contacting the second sheet only at the site and at the time that downward pressure is exerted by said means under user control at a selected user response area, the overlay sheet in use being positioned above the two electroresistive sheets, and wherein a first conductive strip is attached along one edge of said one sheet and a second conductive strip is attached along one edge of the second electroresistive sheet, there being nonconductive material between the two electroresistive sheets normally preventing the two sheets from contacting each other, said downward pressure creating a switching action by causing the top electroresistive sheet to contact the bottom electroresistive sheet and produce resistance values proportional to the distance between said conductive strips and the site of downward pressure by the user, said circuit means being operable to process said resistance values to locate the site of downward pressure and assign such site a code, and wherein the computer is programmed to located from within its memory by use of said code the multiple symbol sequence corresponding to the selected user response area.

14. The apparatus in claim 1, wherein said pattern of sensors comprises upper and lower electroresistive sheets and a conductive and elastic sheet between said electroresistive sheets, the overlay sheet in use being positioned above said sheets, and wherein a first conductive strip is attached along one edge of one of said electroresistive sheets and a second conductive strip is attached along one edge of the other electroresistive sheet, downward pressure at a selected user response area exerted by said means under user control causing the upper electroresistive sheet to first contact the elastic conductive sheet and then, upon application of continued downward pressure, causing the elastic conductive sheet to contact the lower electroresistive sheet and produce resistance values proportional to the distance between said conductive strips and the site of downward pressure by the user, said circuit means being operable to process said resistance values to locate the site of downward pressure and assign such site a code, and wherein the computer is programmed to locate from within its memory by use of said code the multiple symbol sequence corresponding to the selected user response area.

15. The apparatus in claim 1, wherein said pattern of sensors includes an upper, flexible electroconductive strip, an underlying elastic and conductive sheet, and a lower conductive strip beneath said sheet, downward pressure at a user response area by said means under user control causing said upper strip to deflect into contact with said sheet to produce a first switching action, and causing said sheet to deflect downwardly into contact with said lower strip to produce a second switching action to which said circuit means responds to identify the site of switching activation by a code, and wherein said computer has in its memory a program whose content corresponds to the multiple symbol sequences on the overlay sheets and the inputting of said codes results in the hardware means displaying the multiple symbol sequences that are adjacent the selected user response areas.

16. An input apparatus for a word processor comprising:
- a printed overlay sheet having user response areas thereon and multiple symbol sequence indicia adjacent each of said response areas,
- holding frame means for receiving said overlay sheet and positioning the same in overlying relationship to a number of spaced electrical switching sites presented by a corresponding pattern of electrical sensors underlying respective user response areas on the overlay sheet,
- a programmable computer having a memory in which said multiple symbol sequences are stored,
- means under user control for selecting individual response areas and causing activation of the underlying sensors,
- circuit means interconnecting said pattern of sensors and said computer for identifying the site of each sensor that is activated by the user and assigning a code to each site of sensor activation,
- said memory being programmed to identify the codes assigned to the respective sites of sensor activation underlying user-selected response areas, and further programmed to reproduce the user-selected multiple symbol sequences in response to the identified codes,
- computer-linked hardware means for displaying the user-selected multiple symbol sequences, and
- a keyboard input mechanism for inputting single symbols, computer control input functions, and editing functions to said computer, whereby the user may modify, add to, delete or otherwise edit the displayed multiple symbol sequences.

17. The apparatus in claim 16, where the multiple symbol sequence indicia that are on the overlay sheet are in one language, and the multiple symbol sequences that are stored in the computer's memory in response to a given coded input are in a different language, whereby to translate certain standard words, phases, sentences or paragraphs from one language to another.

18. The apparatus as in claim 16, further comprising a computer-linked printer for printing out the displayed multiple symbol sequences and any other input data the user has selected.

19. The apparatus in claim 16, wherein said pattern of sensors comprises a top set and a bottom set of individual conductive strips forming a pattern of points where the individual strips in the top set pass over the individual strips in the bottom set and do not physically contact the individual conductive strips in the bottom set, said user response areas being located on said overlay sheets at corresponding sites where individual conductive strips in the top set pass over individual strips in the bottom set, and wherein said means under user control includes a hand hald probe for emitting an electromagnetic field upon activation by the user to induce electric currents in certain of the individual electroconductive strips in both the top and the bottom sets of conductive strips by the user placing a tip of said probe over a user response area, each such area on the overlay sheet in use lying directly over a point where one of the conductive strips in the top set passes over one of the conductive strips in the bottom set, whereby electromagnetic pulses emitted by the hand held probe activates said circuit means that identifies the particular site of activation by producing the assigned code and causing the computer to search its memory for that particular code and to display the corresponding multiple symbol sequence.

20. The apparatus in claim 19, wherein the individual conductive strips in the top and bottom sets of conductive strips form the vertical and horizontal coordinates of a grid pattern.

21. The apparatus in claim 19, wherein one or both sets of conductive strips are curvilinear, zigzag, or otherwise organized in a non-grid pattern.

22. The apparatus in claim 16, wherein said pattern of sensors comprises two sets of individual conductive strips, one of said sets lying over the other set in a plane that is parallel to said other set to present a pattern of switches, downward pressure by said means under user control causing physical contact to be made between one of the strips in the top set and one of the strips in the bottom set resulting in a switching action to which said circuit means responds to identify the site of switch activation by a code, and wherein said computer has in its memory a program whose content corresponds to the multiple symbol sequences on the overlay sheet and the imputting of said codes results in the hardware means displaying the same user-selected multiple symbol sequences that are adjacent the selected user response areas.

23. The apparatus in claim 22, wherein the two sets of conductive strips are arranged in a grid pattern.

24. The apparatus in claim 22, wherein the conductive strips in one or both sets of conductive strips are arranged in a curvilinear pattern, zigzag pattern, or other non-grid pattern.

25. The apparatus in claim 16, wherein said pattern of sensors comprises two electroresistive sheets, one sheet being positioned above the second electroresistive sheet and contacting the second sheet only at the site and at the time that downward pressure is exerted by said means under user control at a selected user response area, said overlay sheet being positioned above the two electroresistive sheets, and wherein a first conductive strip is attached along one edge of said one sheet and a second conductive strip is attached along one edge of the second electroresistive sheet, there being nonconductive material between the two electroresistive sheets normally preventing the two sheets from contacting each other, said downward pressure creating a switching action by causing the top electroresistive sheet to contact the bottom electroresistive sheet and produce resistance values proportional to the distance between said conductive strips and the site of downward pressure by the user, said circuit means being operable to process said resistance values to locate the site of downward pressure and assign such site a code, and wherein the computer is programmed to locate from within its memory by use of said code the multiple symbol sequence corresponding to the selected user response area.

26. The apparatus in claim 16, wherein said pattern of sensors comprises upper and lower electroresistive sheets and a conductive and elastic sheet between said electroresistive sheets, the overlay sheet in use being positioned above said sheets, and wherein a first conductive strip is attached along one edge of one of said electroresistive sheets and a second conductive strip is attached along one edge of the other electroresistive sheet, downward pressure at a selected user response area exerted by said means under user control causing the upper electroresistive sheet to first contact the elastic conductive sheet and then, upon application of continued downward pressure, causing the elastic conductive sheet to contact the lower electroresistive sheet and produce resistance values proportional to the distance between said conductive strips and the site of downward pressure by the user, said circuit means being operable to process said resistance values to locate the site of downward pressure and assign such site a code, and wherein the computer is programmed to locate from within its memory by use of said code the multiple symbol sequence corresponding to the selected user response area.

27. The apparatus in claim 16, wherein said pattern of sensors includes an upper, flexible electroconductive strip, an underlying elastic and conductive sheet, and a lower conductive strip beneath said sheet, downward pressure at a user response area by said means under user control causing said upper strip to deflect into contact with said sheet to produce a first switching action, and causing said sheet to deflect downwardly into contact with said lower strip to produce a second switching action to which said circuit means responds to identify the site of switching activation by a code, and wherein said computer has in its memory a program whose content corresponds to the multiple symbol sequences on the overlay sheet and the inputting of said codes results in the hardware means displaying the multiple symbol sequences that are adjacent the selected user response areas.

* * * * *

UNITED STATES PATENT AND TRADEMARK OFFICE
CERTIFICATE OF CORRECTION

PATENT NO. : 4,786,896
DATED : November 22, 1988
INVENTOR(S) : J. Richard Harte

It is certified that error appears in the above—identified patent and that said Letters Patent is hereby corrected as shown below:

Column 13, line 38, "The apparatus in claim 2," should be corrected to --The apparatus in claim 1,--.

Signed and Sealed this

Ninth Day of May, 1989

Attest:

DONALD J. QUIGG

Attesting Officer

Commissioner of Patents and Trademarks